(12) United States Patent
Bortner et al.

(10) Patent No.: US 12,457,939 B2
(45) Date of Patent: Nov. 4, 2025

(54) FEED ACCELERATOR FOR AN AGRICULTURAL HARVESTER

(71) Applicant: DEERE & COMPANY, Moline, IL (US)

(72) Inventors: Eric L. Bortner, Davenport, IA (US); Balaji Parthasarathy, Bettendorf, IA (US); Mark L. Mattson, Erie, IL (US); Manish Singh, Bokaro (IN); Michael T. Meschke, Eldridge, IA (US); Nithin Chaithanya Reddy Choudary, Bettendorf, IA (US)

(73) Assignee: Deere & Company, Moline, IL (US)

( * ) Notice: Subject to any disclaimer, the term of this patent is extended or adjusted under 35 U.S.C. 154(b) by 932 days.

(21) Appl. No.: 17/456,292

(22) Filed: Nov. 23, 2021

(65) Prior Publication Data

US 2023/0157211 A1 May 25, 2023

(51) Int. Cl.
*A01F 12/10* (2006.01)
*A01F 12/12* (2006.01)

(52) U.S. Cl.
CPC .............. *A01F 12/12* (2013.01); *A01F 12/10* (2013.01)

(58) Field of Classification Search
CPC ... A01F 12/00–12/60; A01F 7/00–7/70; A01D 61/008
See application file for complete search history.

(56) References Cited

U.S. PATENT DOCUMENTS

| | | | |
|---|---|---|---|
| 5,454,758 A * | 10/1995 | Tophinke | A01F 7/06 460/68 |
| 6,551,186 B2 | 4/2003 | Voss et al. | |
| 8,118,652 B2 * | 2/2012 | Hollatz | A01F 7/06 460/73 |
| 9,043,959 B2 * | 6/2015 | Esken | A01F 12/10 |
| 9,338,945 B2 * | 5/2016 | Becker | A01F 12/10 |
| 10,091,941 B2 * | 10/2018 | Bojsen | A01F 7/04 |
| 10,653,070 B2 * | 5/2020 | Kraus | A01F 15/10 |

(Continued)

FOREIGN PATENT DOCUMENTS

| | | | | |
|---|---|---|---|---|
| DE | 10115652 C1 * | 7/2002 | ........... | A01D 43/086 |
| EP | 3031316 A1 * | 6/2016 | ............. | A01F 7/067 |

(Continued)

OTHER PUBLICATIONS

CNH CR Revelation Brochure, pp. 1-44, (2019).

*Primary Examiner* — Joseph M Rocca
*Assistant Examiner* — Madeline I Runco
(74) *Attorney, Agent, or Firm* — Lucian Wayne Beavers; Patterson Intellectual Property Law, PC

(57) ABSTRACT

Apparatuses and methods of feed accelerators of agricultural harvesters include one or more convertible sections that are convertible between two or more types of agitator assemblies. The feed accelerators may include a cylindrical body that may form one or more facets, and the feed accelerators may include an exterior wall and a plurality of paddles distributed along the exterior wall. The plurality of paddles may be arranged in a plurality of rows. The agitator assemblies may include a first type that includes an agitator having sidewalls that for a geometrical shape, such as a chevron that extends from the exterior wall. A second type of agitator may include one or more paddles that may align with one or more rows formed on the exterior wall.

17 Claims, 13 Drawing Sheets

(56) References Cited

U.S. PATENT DOCUMENTS

| | | | | |
|---|---|---|---|---|
| 10,653,071 | B2* | 5/2020 | Kraus | A01D 89/008 |
| 2002/0103015 | A1* | 8/2002 | Gerber | A01D 61/008 |
| | | | | 460/73 |
| 2006/0079307 | A1* | 4/2006 | Van De Sluis | A01F 12/10 |
| | | | | 460/16 |
| 2012/0100898 | A1* | 4/2012 | Mygind | A01F 7/067 |
| | | | | 460/22 |
| 2016/0007536 | A1* | 1/2016 | Bussmann | A01F 7/06 |
| | | | | 460/83 |
| 2018/0249640 | A1* | 9/2018 | Kraus | A01F 15/10 |
| 2020/0205342 | A1* | 7/2020 | Robertson | A01F 12/12 |
| 2020/0337245 | A1* | 10/2020 | Pellmann | A01F 7/067 |
| 2020/0352105 | A1* | 11/2020 | Singh | A01F 12/30 |
| 2023/0397539 | A1* | 12/2023 | Jongmans | A01F 12/10 |

FOREIGN PATENT DOCUMENTS

| | | | | | |
|---|---|---|---|---|---|
| EP | 3031316 | B1 | | 11/2017 | |
| EP | 3335543 | A1 * | 6/2018 | | A01F 12/10 |
| EP | 3369305 | A1 * | 9/2018 | | A01F 15/00 |
| EP | 3782454 | A1 * | 2/2021 | | A01F 12/10 |

* cited by examiner

FEED ACCELERATOR FOR AN AGRICULTURAL HARVESTER

FIELD OF THE DISCLOSURE

The present disclosure relates generally to agricultural harvesters and, particularly, to crop processing apparatuses of agricultural harvesters.

BACKGROUND OF THE DISCLOSURE

Harvesters, such as combine harvesters, utilize equipment, such as a header coupled to the harvester, to harvest crop. In some instances, the harvested crop is conveyed from the header to a feederhouse of the harvester. The feederhouse directs the harvested crop material to a feed accelerator that accelerates and directs the crop material towards threshing equipment, such as a rotor and concave assembly, that functions to separate grain from material other than grain ("MOG").

SUMMARY OF THE DISCLOSURE

A first aspect of the present disclosure is directed to a feed accelerator for an agricultural harvester that may include a cylindrical body comprising an exterior wall; a central longitudinal axis extending along the cylindrical body; and a convertible section of the exterior wall. The cylindrical body may be rotatable about the central longitudinal axis, and a plurality of first paddles may be arranged on the exterior wall. The convertible section may be convertible between a first agitator assembly and a second agitator assembly.

A second aspect of the present disclosure is directed to an agricultural harvester that may include a feederhouse that is configured to received crop material and a feed accelerator located downstream from the feederhouse. The feed accelerator may be configured to accelerate the received crop material. The feed accelerator may include a cylindrical body comprising an exterior wall; a central longitudinal axis extending along the cylindrical body; a plurality of first paddles arranged on the exterior wall; and a convertible section of the exterior wall. The cylindrical body may be rotatable about the central longitudinal axis, and the convertible section may be convertible between a first agitator assembly and a second agitator assembly.

Another aspect of the present disclosure is directed to a method of configuring a feed accelerator in response to a change in crop conditions. The method may include providing a feed accelerator. The feed accelerator may include a cylindrical body comprising an exterior wall; a central longitudinal axis extending along the cylindrical body; a plurality of first paddles arranged on the exterior wall; and a convertible section of the exterior wall. The cylindrical body may be rotatable about the central longitudinal axis, and the convertible section may be convertible between a first agitator assembly and a second agitator assembly. The method may also include converting from one of the first agitator assembly or the second agitator assembly to the other of the first agitator assembly or the second agitator assembly.

The various aspects may include one or more of the following features. The first agitator assembly may include an agitator including a sidewall extending from the exterior wall, and the sidewall may extend obliquely relative to the central longitudinal axis. The first agitator assembly may include a first sidewall and a second sidewall extending from the exterior wall. The first sidewall and the second sidewall may form a chevron shape. The first sidewall and the second sidewall may be bent such that end portions of the first sidewall and the second sidewall flare outwardly away from each other. The first agitator assembly further may include a third sidewall extending between the first sidewall and the second sidewall. The third sidewall may extend between ends of the first sidewall and the second sidewall. A first end of the first sidewall and a first end of the second sidewall may be coupled to form a vertex of the chevron. The third sidewall may extend from the vertex. The second agitator assembly may include at least one second paddle. The first plurality of paddles arranged on the exterior wall may be arranged in a plurality of rows extending along the cylindrical body. The second agitator assembly may align with a row of the plurality of rows when the second agitator assembly is coupled to the cylindrical body such that the at least one second paddle aligns with the first plurality of paddles included in the row. The first plurality of paddles arranged on the exterior wall may be arranged in a plurality of rows extending along the cylindrical body parallel with the central longitudinal axis. The cylindrical body may include a length, and the convertible section may be located at a central location along the length of the cylindrical body. The convertible section may be convertible from one of the first agitator assembly or the second agitator assembly to the other of the first agitator assembly or the second agitator assembly by replacement of one of the first agitator assembly or the second agitator assembly with the other of the first agitator assembly or the second agitator assembly. A plurality of convertible sections may be included. The first plurality of paddles arranged on the exterior wall may be arranged in a plurality of rows extending along the cylindrical body. Alternating rows of the plurality of rows may align with one of the convertible sections. The first plurality of paddles arranged on the exterior wall may be arranged in a plurality of rows extending along the cylindrical body, the first paddles of adjacent rows may be laterally offset from each other. The convertible section may include a plurality of convertible sections removably couplable to the cylindrical body. At least one of the first paddles may define a plane that is parallel with and laterally offset from the central longitudinal axis.

Other features and aspects will become apparent by consideration of the detailed description and accompanying drawings.

BRIEF DESCRIPTION OF THE DRAWINGS

The detailed description of the drawings refers to the accompanying figures in which.

DETAILED DESCRIPTION

Figure 1:
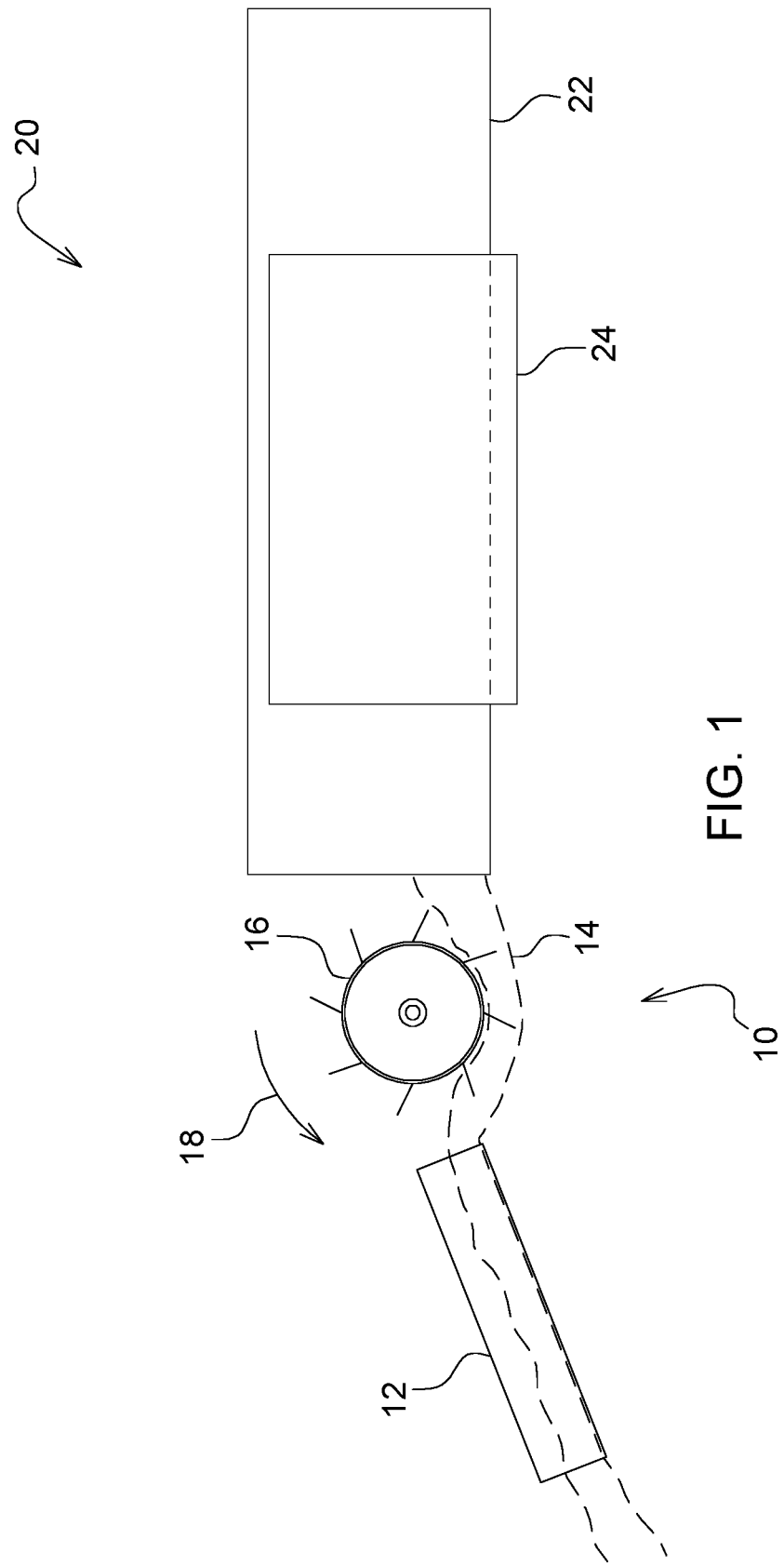
FIG. 1 is a partial schematic view of an example combine harvester, according to some implementations of the present disclosure.

For the purposes of promoting an understanding of the principles of the present disclosure, reference will now be made to the implementations illustrated in the drawings, and specific language will be used to describe the same. It will nevertheless be understood that no limitation of the scope of the disclosure is intended. Any alterations and further modifications to the described devices, systems, or methods and any further application of the principles of the present disclosure are fully contemplated as would normally occur to one skilled in the art to which the disclosure relates. In particular, it is fully contemplated that the features, components, and/or steps described with respect to one implementation may be combined with the features, components, and/or steps described with respect to other implementations of the present disclosure.

The present disclosure is directed to feed accelerators (sometimes referred to as "beaters") of an agricultural harvester. Particularly, the present disclosure is directed to convertible feed accelerators that include one or more convertible sections that are configurable between different crop engagement features (e.g., agitators), such as to accommodate or adapt to changing crop conditions, for example. Consequently, the feed accelerator is capable of being quickly converted between configurations to address, for example, different crops or crop conditions. Feed accelerators within the scope of the present disclosure provide for improved material flow and reduced risk of back feeding of crop material. Back feeding occurs when incoming crop material from a feederhouse of an agricultural harvester is circulated by a feed accelerator rather than being advanced downstream for further processing, such as to a rotor and concave for threshing. As a result, the circulated crop material is redirected towards the incoming crop material, creating interference with the incoming crop material. The result is that the circulated crop material can be forced into the feederhouse or otherwise cause problems with continuous feeding of crop material into the agricultural harvester.

FIG. 1 is a partial schematic view of an example agricultural harvester 10 that includes a feederhouse 12 through which harvested crop material 14 is fed during a harvesting operation. In some implementations, the agricultural harvester 10 is a combine harvester. The feederhouse 12 receives harvested crop material, for example, from a header attached to the agricultural harvester 10. A flow of the crop material 14 is directed to a feed accelerator 16 that rotates in the direction of arrow 18. The feed accelerator 16 accelerates the flow of crop material 14 and directs the accelerated flow of crop material to subsequent crop material processing equipment, such as a threshing system 20. The example threshing system 20 includes a rotor 22 and concave 24 that operate in concert to separate grain from material other than grain ("MOG").

Figure 3:
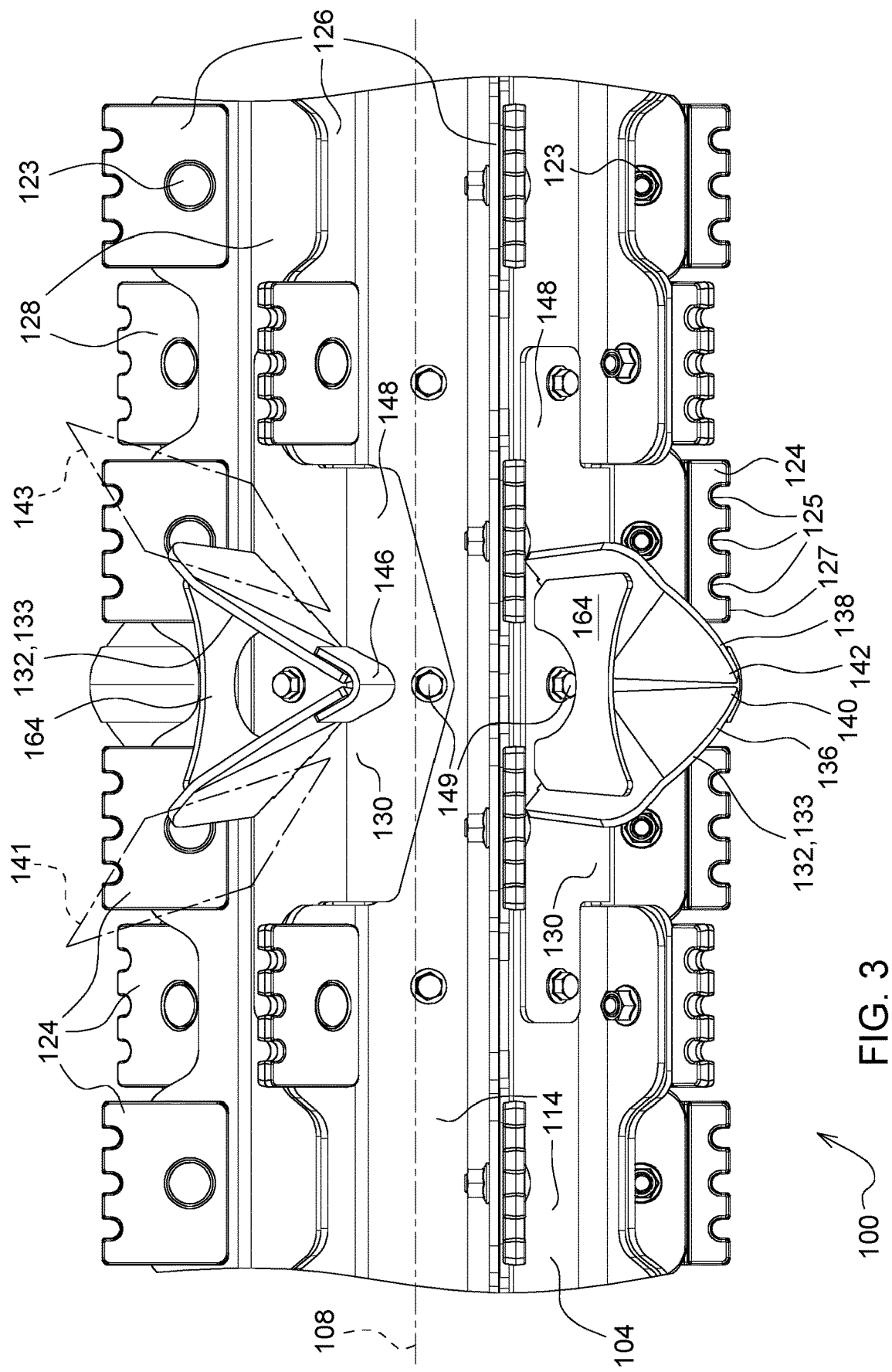
FIG. 3 is a detail view of the feed accelerator of FIG. 2 in the first configuration.
Figure 4:
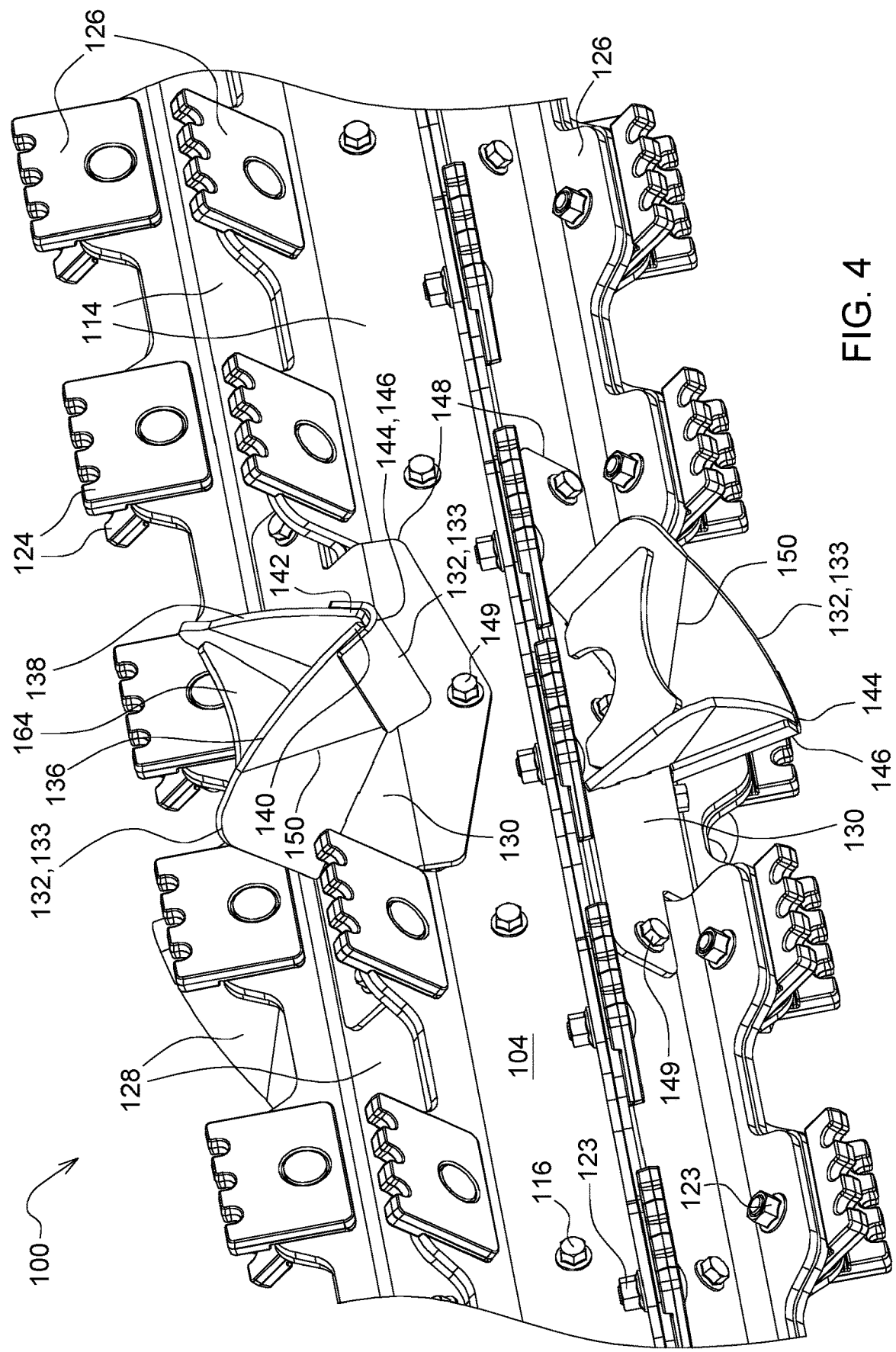
FIG. 4 is an oblique view of a portion of the feed accelerator of FIG. 2 in the first configuration.
Figure 5:
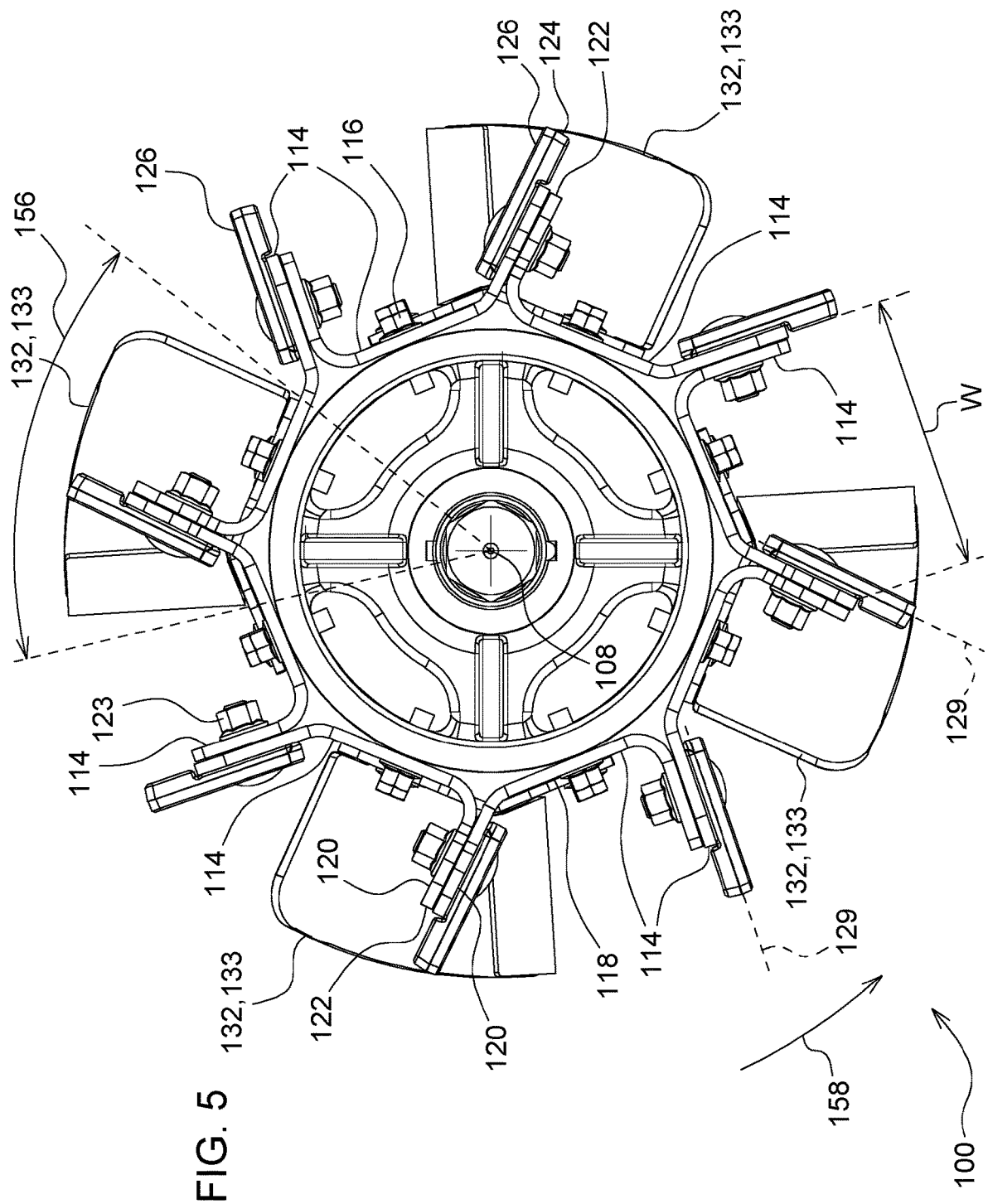
FIG. 5 is a side view of feed accelerator of FIG. 2 in the first configuration.
Figure 6:
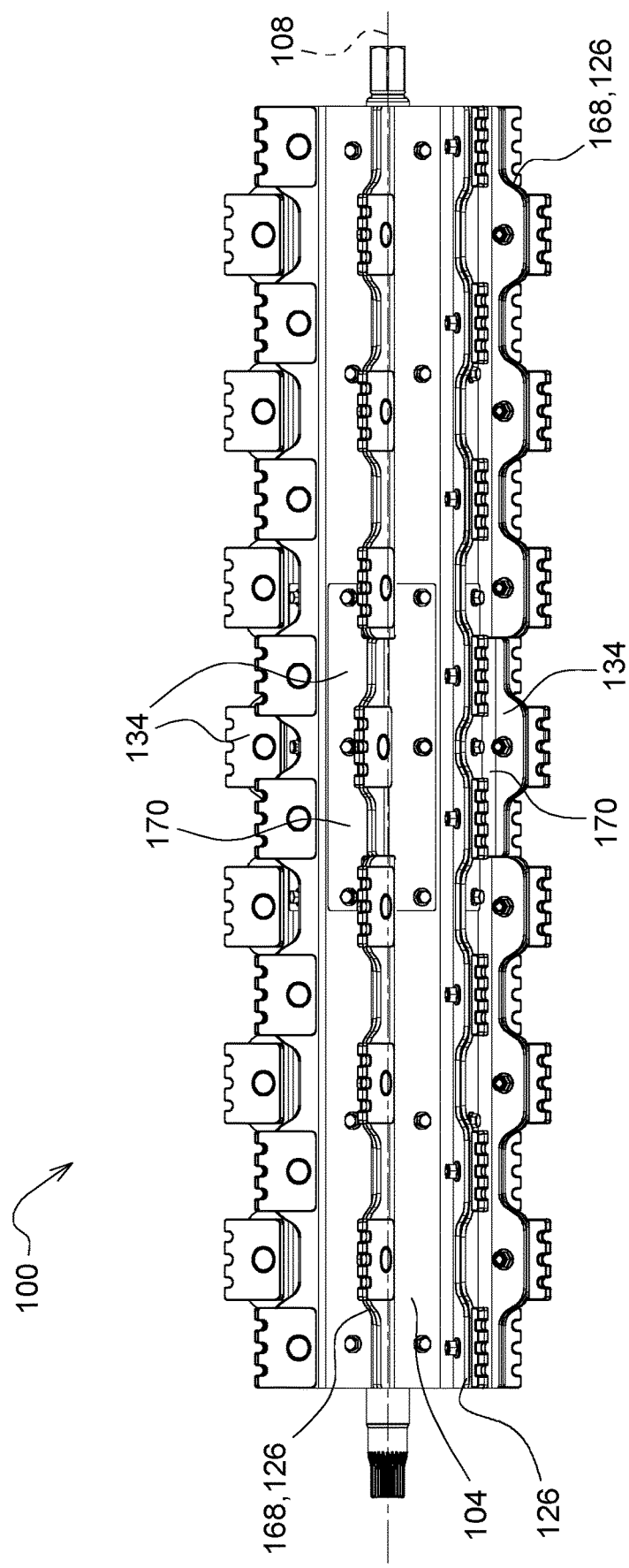
FIG. 6 is a front view of the feed accelerator of FIG. 2 in a second configuration.
Figure 7:
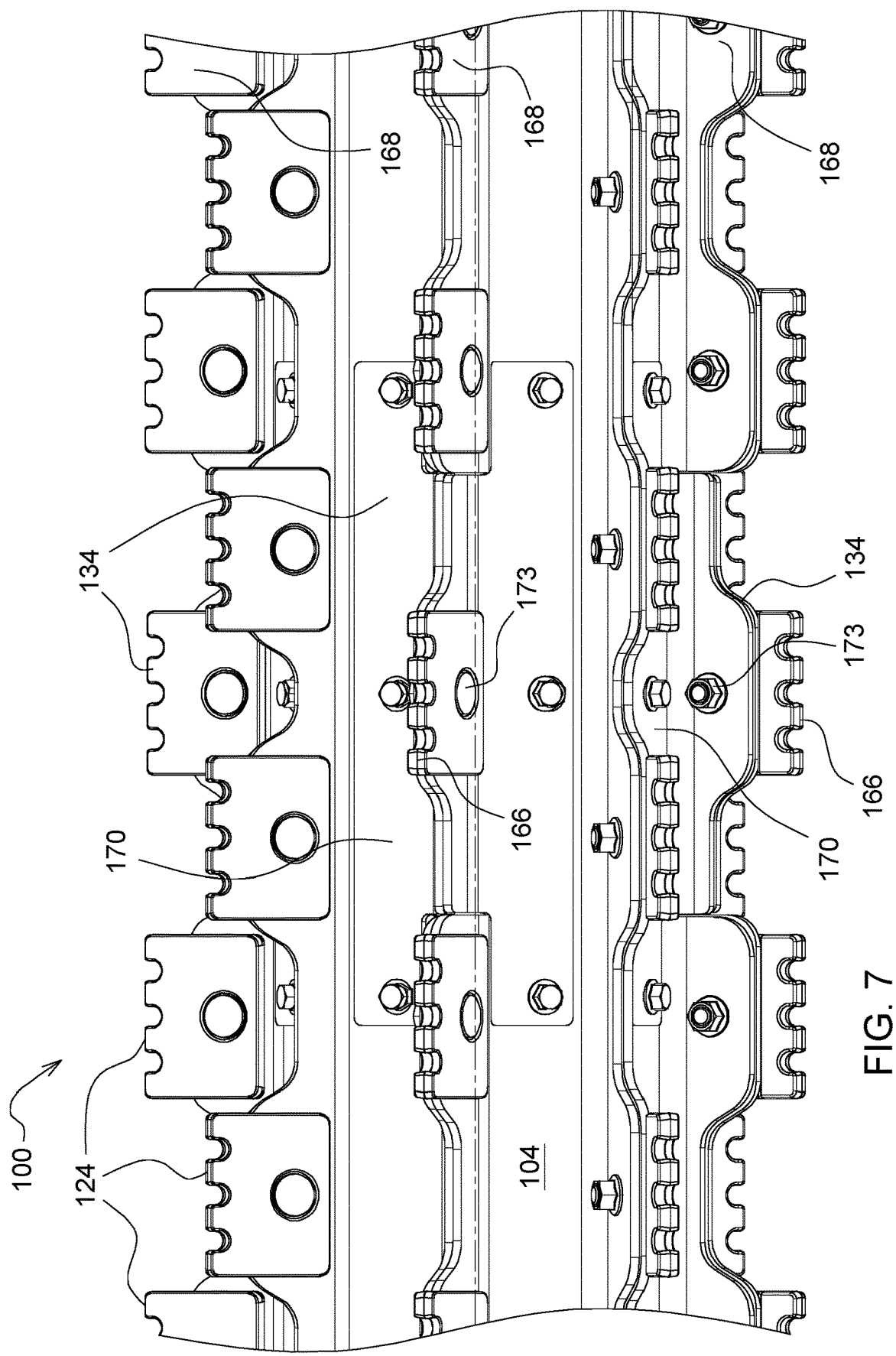
FIG. 7 is a detail view of the feed accelerator of FIG. 2 in the second configuration.
Figure 8:
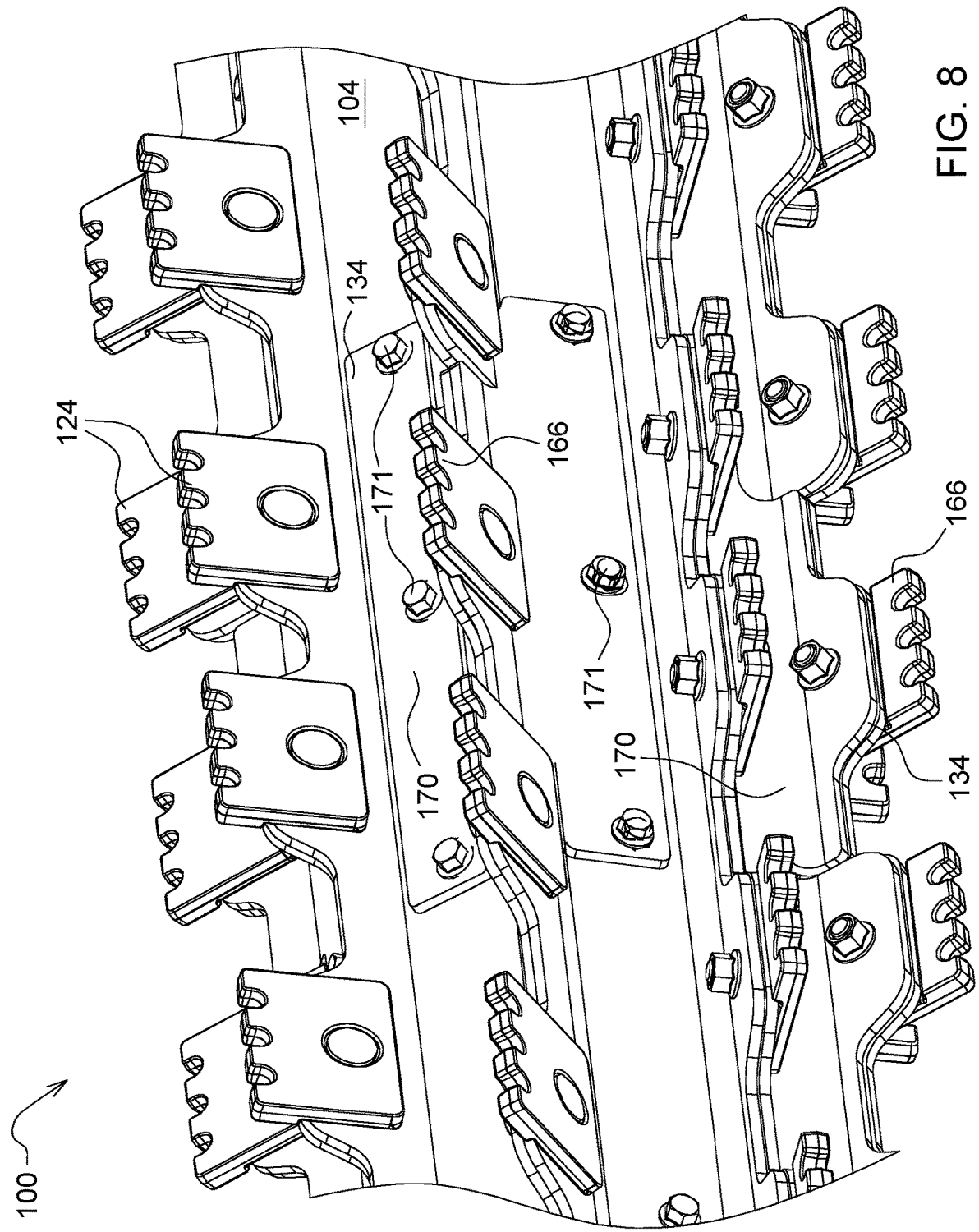
FIG. 8 is an oblique view of the feed accelerator of FIG. 2 in the second configuration.

FIGS. 2 through 8 illustrate an example feed accelerator 100. FIGS. 2 through 5 show the feed accelerator 100 in a first configuration, and FIGS. 6 through 8 show the feed accelerator 100 in a second configuration. The feed accelerator 100 includes a cylindrical body 102 having an exterior wall 104. The feed accelerator 100 also includes a shaft 106 positioned centrally along the cylindrical body 102. The cylindrical body 102 defines a central longitudinal axis 108 that extends along the shaft 106 along a centerline thereof, as shown in FIG. 5. The feed accelerator 100 is rotatable about the central longitudinal axis 108. In the illustrated example, the shaft 106 rotates with the cylindrical body 102.

A first end 110 of the shaft 106 includes a power transmission feature 111. Particularly, the first end 110 is splined and is configured to mate with a splined female surface. The splined connection formed between the first end 110 and the counterpart female splined surface operates to transmit a rotation to the cylindrical body 102 to rotate the feed accelerator 100, such as at a desired rotational speed. In other implementations, the first end 110 has different power transmission features, such as a keyed connection or a pinned connection. A second end 112 of the shaft is configured to couple to a rotatable coupling, such as a bearing, to facilitate rotation of the shaft 106 and, consequently, the cylindrical body 102.

In the illustrated example, the exterior wall 104 forms a general faceted cylindrical shape in cross-section, as show, for example, in FIG. 5. In other implementations, a cross sectional shape of the exterior wall 104 forms other types of shapes, such as a circular cross-sectional shape, a square cross-sectional shape, a triangular cross-sectional shape, or any other type of polygonal cross-sectional shape. As shown in FIG. 5, the exterior wall 104 is formed from a plurality of elongate sections 114. In the illustrated example, the elongate sections 114 are secured to the cylindrical body via fasteners 116 (shown in FIG. 2), e.g., nuts and bolts. However, in other implementations, the elongate sections 114 can be secured to the cylindrical body 102 in other ways, such as an interlocking arrangement, welding, rivets, or an adhesive.

Each elongate section 114 forms a general "U" shape having a base 118 and sides 120 extending from the base 118. A side 120 of each elongate section 114 is connected to the side 120 of an adjacent elongate section 114, as shown, for example, in FIG. 5. The connected sides form platforms 122 to which paddles 124 are mounted. In the illustrated example, the paddles 124 are attached to the connected sides 120 of the elongate sections 114 via fasteners 123, such as nuts and bolts. In other implementations, the paddles 124 are attached in other ways, such as with rivets, an interlocking arrangement, welding, or an adhesive. As shown in FIG. 3, the paddles 124 include a plurality of notches 125 formed in an edge 127. In other implementations, the edge 127 may have a different contour. In still other implementations, the notches 125 are omitted and the edge 127 is continuous.

Referring to FIG. 5, the paddles 124 define planes 129 that are parallel to, but offset from, the central longitudinal axis 108. In other implementations, the paddles 124 have different orientations relative to the central longitudinal axis 108. For example, in some instances, one or more of the paddles 124 define a plane that is parallel to and extend through the central longitudinal axis 108. Other orientations of the paddles 124 being angled relative to the central longitudinal axis 108 are also contemplated.

As shown in FIGS. 2 to 8, the paddles 124 are arranged in a plurality of rows 126 that extend longitudinally along the cylindrical body 102. In the illustrated example, the rows 126 extend in a direction that is parallel with the central longitudinal axis 108. Further, in the illustrated example, paddles 124 provided in adjacent rows 126 are laterally offset from each other. Thus, in some implementations, a gap 128 (shown, for example, in FIG. 3) formed between adjacent paddles 124 in one row 126 is circumferentially adjacent to a paddle 124 is an adjacent row 126.

In the illustrated example, the feed accelerator 100 includes eight elongated sections 114 that define eight rows 126 of paddles 124. The rows 126 are uniformly angularly distributed about the central longitudinal axis 108. Thus, in the illustrated example, each row 126 is angularly offset from an adjacent row 126 about the central longitudinal axis 108 by 45°. In other implementations, the feed accelerator 100 includes a different number of elongated sections 114, a different number of rows 126, or both. In some implementations, the rows 126 are nonuniformly distributed about a circumference of the cylindrical body 102. In some instances, the feed accelerator 100 includes fewer than eight rows 126, while, in other instances, the feed accelerator 100 includes more than eight rows 126.

The feed accelerator 100 also includes convertible sections 130. The convertible sections 130 are centrally located along the cylindrical body 102. For example, in some implementations, the convertible sections 130 are centered along a longitudinal length, L, of the cylindrical body 102. In other implementations, one or more of the convertible sections 130 is positioned off-center along the length L of the cylindrical body 102.

The convertible sections 130 are convertible between different agitator assemblies. In the present example, the convertible sections 130 are convertible between two different agitator assemblies 132 and 134. In other implementations, a plurality of different assemblies are selectable. For example, a plurality of agitators having different configurations are selectable at the convertible sections 130. In FIGS. 2 through 5, the convertible sections 130 are converted to the agitator assemblies 132 and 134. The agitator assembly 132 includes an agitator 133 that includes sidewalls 136 and 138 that extend from the exterior wall 104. The sidewalls 136 and 138 are joined at first ends 140, 142 respectively thereof to form a vertex 144. The sidewall 136 defines plane 141, and the sidewall 138 defines plane 143. The planes 141 and 143 are oblique to and intersects the central longitudinal axis 108.

The sidewalls 136 and 138 diverge from each other to form a chevron shape to define an angle 139. In some implementations, the angle 139 is within a range of 35° to 75°. The agitator 133 also includes a leading edge component 146. The leading edge component 146, along with the "V" shape of the agitator 133, increases durability of the agitator 133. The leading edge component 146 has a "V" shape and is attached to the first ends 140, 142 of the first and second sidewalls 136 and 138, respectively. The leading edge component 146 defines the vertex 144 of the chevron-shaped agitator 133. In some implementations, the leading edge component 146 is joined to the first ends 140 and 142 by welding. In other implementation, the leading edge component 146 connects in other ways, such as an interlocking arrangement (e.g., a nesting slot and tab arrangement), an adhesive, or with fasteners (e.g., nuts and bolts). In other implementations, the leading edge component 146 is omitted.

The sidewalls 136 and 138 are attached to a base plate 148. In some implementation, the sidewalls 136 and 138 are welded to the base plate 148. In other implementations, the sidewalls 136 and 138 are attached to base plate 148 in other ways, such as with fasteners, rivets, adhesive, or interlocking joints. In this example, the base plate 148 of the agitator assembly 132 is removably securable to the cylindrical body 102, such as to the exterior wall 104, with fasteners 149, such as nuts and bolts. In this way, the agitator assembly 132 is quickly removable from the cylindrical body 102 and replaceable with a different agitator assembly, such as agitator assembly 134. Thus, feed accelerator 100 can be quickly converted among a plurality of different configurations based on a type of agitator provided at the convertible sections 130. The agitator assemblies positioned on the cylindrical body 102 to engage crop material can be located onto the exterior wall 104 in other ways. In other implementations, the agitator assembly 132 is securable to the exterior wall 104 in other ways, such as with interlocking joints or pins.

In some implementations, the base plate 148 is contoured to engaged two elongated sections 114 defining two facets of the cylindrical body 102. In other implementations, the base plate 148 may be contoured to engaged fewer or additional facets of the cylindrical body 102.

In the illustrated example, the different agitator assemblies are removably coupled to the exterior wall 104. In other implementations, the first agitator 132 and the second agitator 134 are linked, and rotation about an axis in a first direction causes one of the first agitator 132 and the second agitator 134 to extend outwardly from the exterior wall 104. Rotation about the axis in a second direction causes the other of the first agitator 132 and the second agitator 134 to extend outwardly from the exterior wall 104. For example, in some instances, the convertible sections 130 include an assembly that is pivotably coupled to the cylindrical body 102 and pivotable about an axis. The assembly includes different agitators. For example, the pivotable assembly may include two different agitator types, and rotation of the pivotable assembly about the axis in a first direction to a first position positions one of the agitators to extent from the exterior wall 104. Rotation of the pivotable assembly in a second direction of rotation about the axis moves the pivotable assembly to a second position in which the second agitator is positioned to extend from the exterior wall 104. The pivotably assembly may be locked into respective first or second positions.

Referring to FIG. 4, in some instances, the sidewalls 136 and 138 include bends 150. The bends 150 cause second ends 152, 154 of the sidewalls 136 and 138, respectively, to flare outwardly away from each other. In this manner, the sidewalls 136 and 138 approximate a shape of an auger flight.

Figure 12:
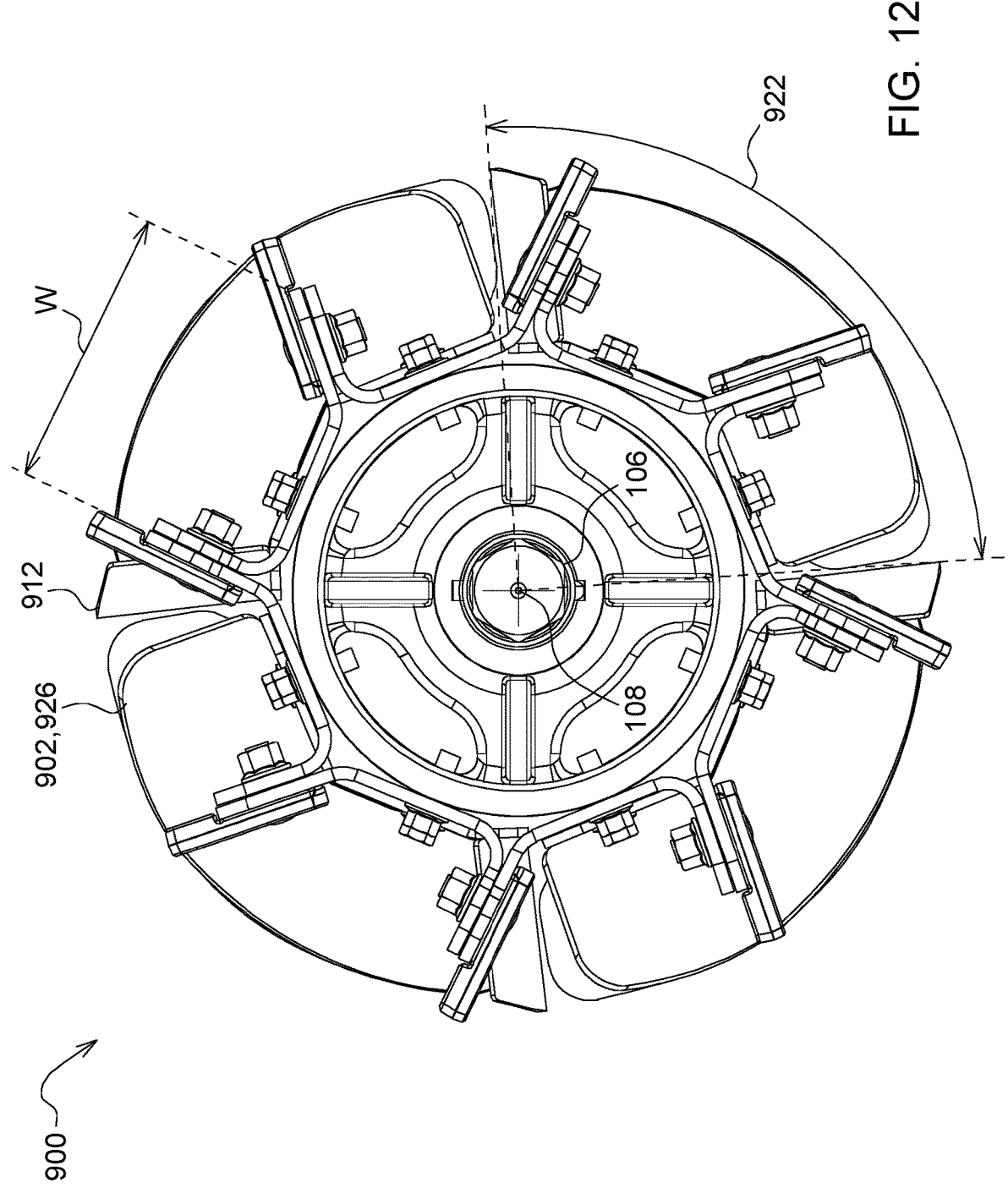
FIG. 12 is a side view of feed accelerator of FIG. 9 in the first configuration.

The agitator 133 extends across two of the elongated sections 114. Particularly, as shown in FIG. 5, the agitator 133 extends partially across a width W of two of the elongated sections 114. In other implementations, such as the example feed accelerator shown in FIGS. 9 through 12, an agitator 926 extends across three of the elongated sections 114, as shown in FIG. 12. Particularly, the agitator 926 extends entirely across the width W of one elongated section 114 and partially across the width W of two adjacent elongated sections 114. Thus, as shown in FIG. 12, the agitator 926 (discussed in more detail below) spans a larger angular amount 922 than an angular amount 156 of the agitator 133, as illustrated in FIG. 5.

The feed accelerator 100 is rotated in the direction of arrow 158 (shown in FIG. 5) such that the vertex 144 leads in engaging crop material by the agitator 133. In this way, the agitator assembly 132 increases shear forces applied to the crop material, accelerates the flow of crop material, while also operating to split the flow of crop material into separate flows (such as flows 160 and 162 shown in FIG. 2). The crop flows are directed, for example, to a threshing system of a combine harvester.

Figure 2:
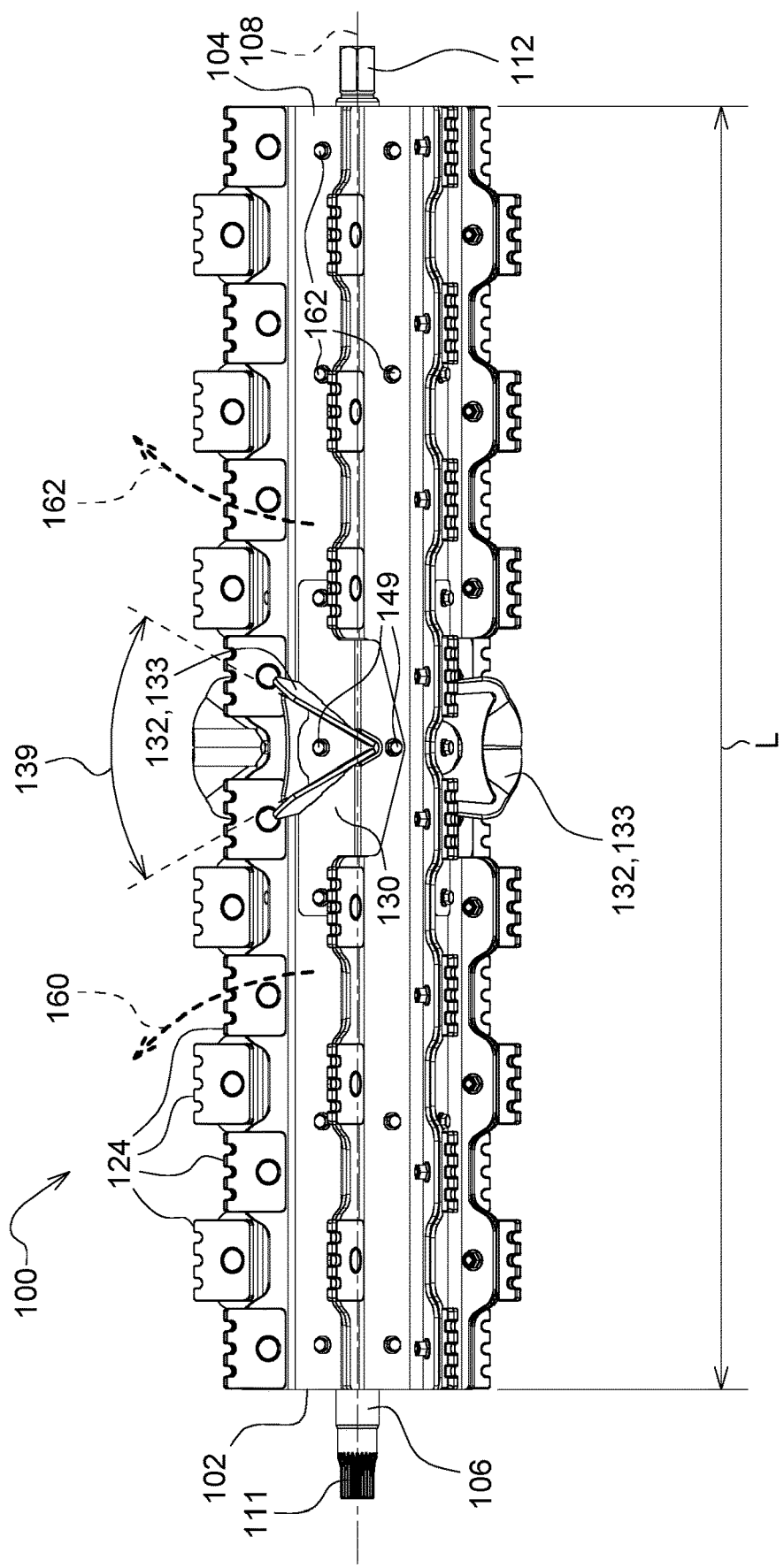
FIG. 2 is a front view of an example feed accelerator in a first configuration, according to some implementations of the present disclosure.

Referring to FIGS. 2 through 4, the agitator assembly 132 also includes another sidewall 164. The sidewall 164 forms part of the agitator 133 and extends between the second ends 152 and 154 of the sidewalls 136 and 138, respectively. The sidewalls 136, 138, and 164 define a triangular structure of the agitator 133. The sidewall 164 increases rigidity and strength of the agitator 133. In other implementations, the third sidewall 164 is omitted.

FIGS. 6 through 8 illustrate the feed accelerator 100 with the convertible sections 130 are converted to the agitator assemblies 134. The agitator assemblies 134 include a paddle 166. The paddle 166 is similar to the paddles 124. In other implementations, additional paddles 166 are included on the agitator assembly 134. As shown, the paddles 166 align with the paddles 124 in rows 168 of the rows 126. Thus, with the convertible sections 130 converted to the second agitator assemblies 134, each of the rows 126 contain a continuous row of paddles.

The agitator assembly 134 includes a base plate 170 that is removably securable to the exterior wall 104. The paddles 166 are attached to the base plate 170 using fasteners (such as fasteners 171), rivets, interlocking features, an adhesive, or in some other way. In the illustrated example, the base plate 170 is removably securable to the cylindrical body 102, such as to the exterior wall 104, with fasteners 171, such as nuts and bolts. Consequently, the agitator assembly 134 is quickly removable from the cylindrical body 102 and replaceable with a different agitator assembly, such as agitator assembly 132. In other implementations, the base plate 170 is removably securable to cylindrical body 102 in other ways, such as with an interlocking joint or pins. In other implementations, as explained earlier, the agitator assemblies 132 and 134 are convertible in other ways, such as rotation about an axis. The paddle 166 is mounted to the base plate 170, such as with fasteners 173 (e.g., nuts and bolts). In other instances, the mounting plate 170 is attached using rivets, welding, an interlocking arrangement, an adhesive, or in other ways.

In some implementations, the base plate 170 is contoured to engage elongated segments 114 forming two facets of the cylindrical body 102. In other implementations, the base plate 170 may be contoured to engage fewer or additional facets of the cylindrical body 102.

FIGS. 9-13 are views of another example feed accelerator 900. The feed accelerator 900 is similar to the feed accelerator 100, described earlier. Similar features are identified with the same reference numbers as used earlier in describing the feed accelerator 100, and the description of those similar features are omitted herefrom. Portions of the feed accelerator 900 that vary from the feed accelerator 100 are described in more detail below.

Similar to the feed accelerator 100, the feed accelerator 900 includes convertible sections 130 that are convertible between different agitator assemblies. The feed accelerator 900 includes four convertible sections 130 and eight rows 126 of paddles 124. In other implementations, the feed accelerator 900 may include additional or fewer convertible sections 130 and additional or fewer rows 126 of paddles 124.

In the illustrated example, the convertible sections 130 are convertible between agitator assemblies 902 and 904. The agitator assembly 902 includes sidewalls 906, 908 and 910; a leading edge component 912; and a base plate 914. The sidewalls 906, 908, and 910 converge to form a vertex 916, and sidewalls 906 and 908 define an angle 917. In some implementations, the angle 917 is within a range of 35° to 75°. The leading edge component 912 connects to the sidewalls 906 and 908. Particularly, the leading edge component 912 is connected to first ends 918 and 920 of the sidewalls 906 and 908, respectively. In other implementations, the leading edge component 912 connects to all of the sidewalls 906, 908, and 910. In some implementations, the leading edge component 912 connects to one or more of the sidewalls 906, 908, and 910 via fasteners, welding, rivets, an adhesive, an interlocking arrangement, or in another way. In some implementations, the leading edge component 912 is omitted. The sidewall 910 extends between the sidewalls 906 and 908 and divides the angle 917 formed therebetween. In some instances, the sidewall 910 bisects the angle 917. In some implementations, an outer edge 911 of the sidewall 910 is serrated.

Figure 10:
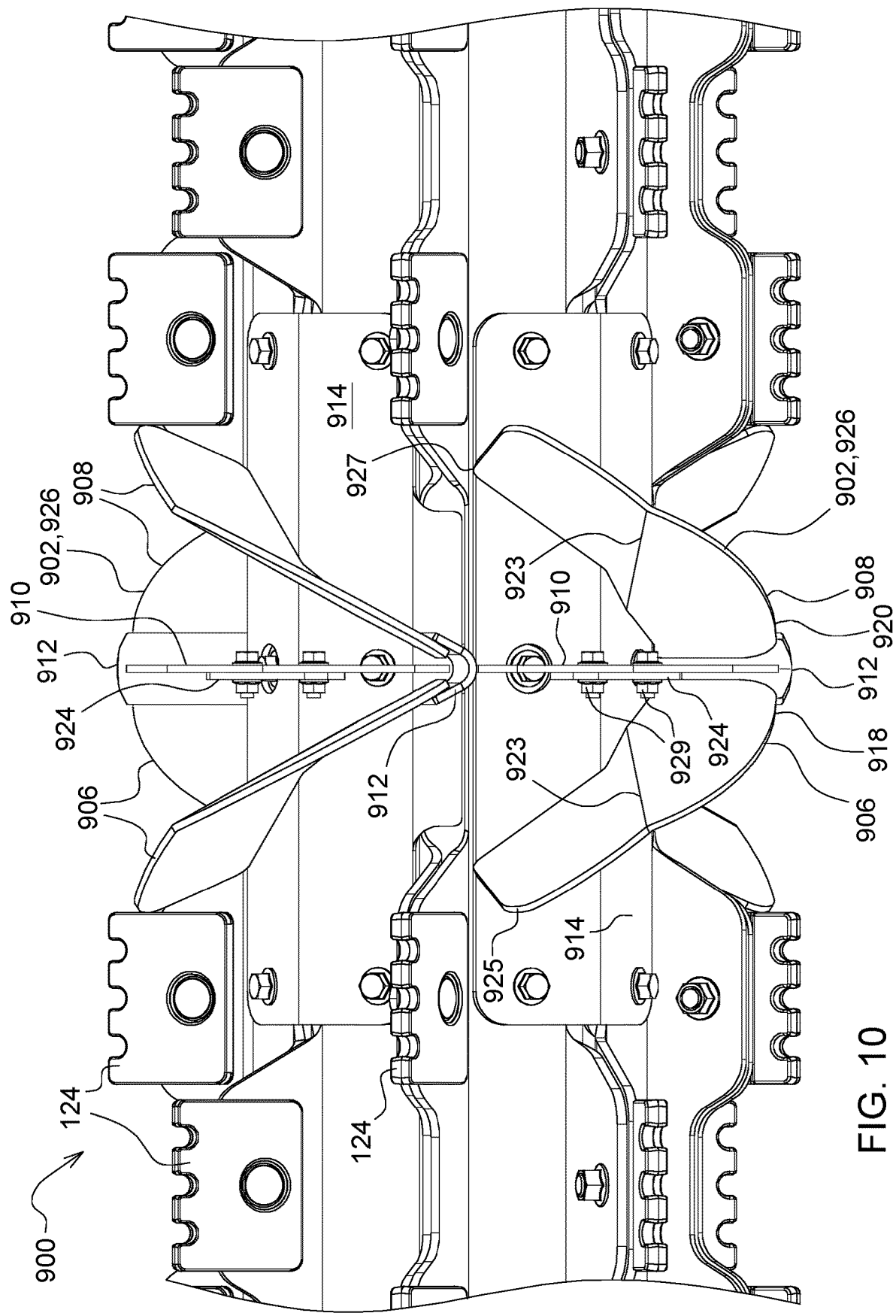
FIG. 10 is a detail view of the feed accelerator of FIG. 9 in the first configuration.
Figure 11:
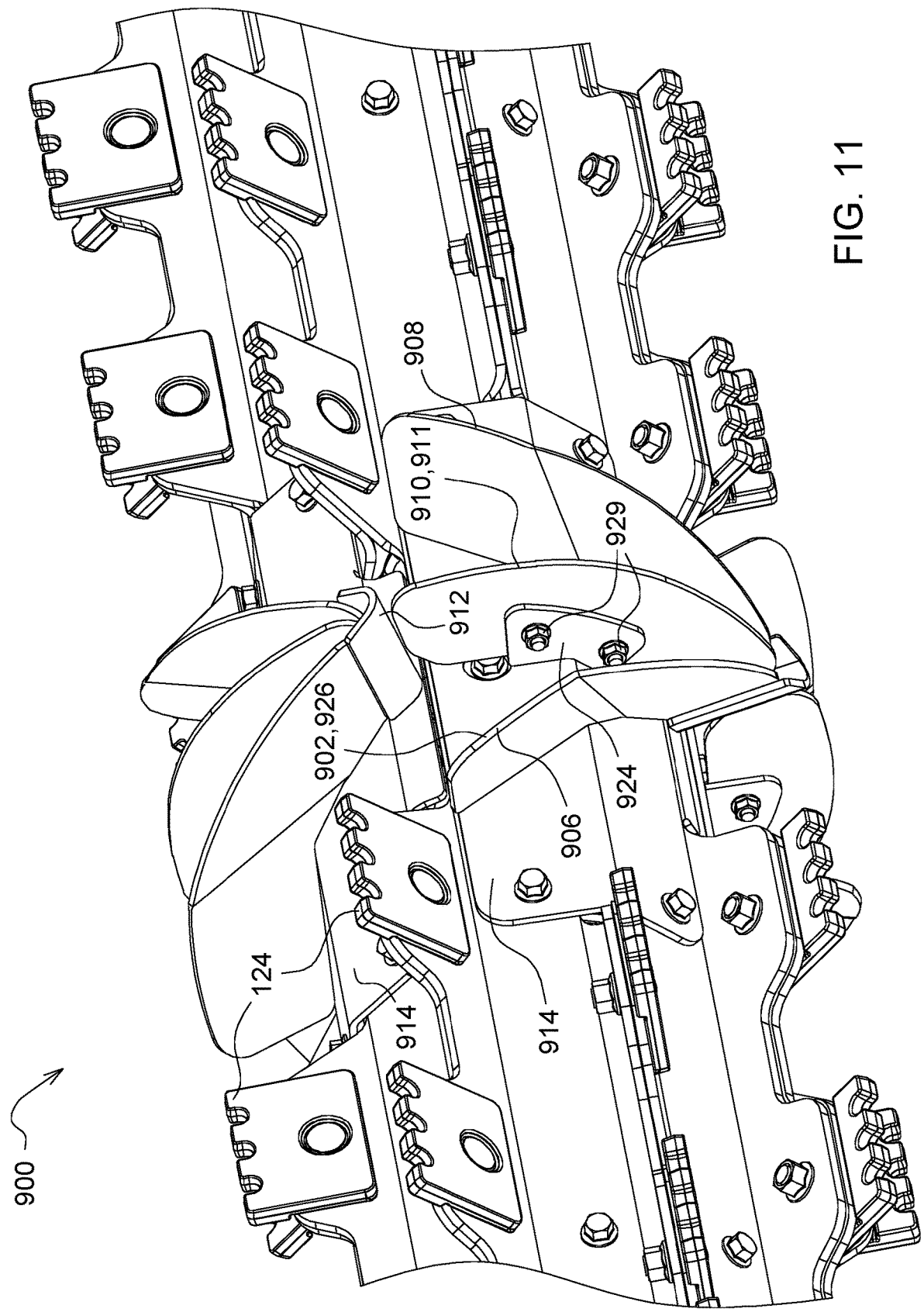
FIG. 11 is an oblique view of a portion of the feed accelerator of FIG. 9 in the first configuration.

Similar to the sidewalls 136 and 138 described earlier, in some instances, the sidewalls 906 and 908 include bends 923, as shown in FIG. 10. The bends 923 cause second ends 925, 927 of the sidewalls 906 and 908, respectively, to flare outwardly away from each other. In this manner, the sidewalls 136 and 138 approximate a shape of an auger flight.

The sidewalls 906, 908, and 910 are secured to the base plate 914, such as with fasteners, welding rivets, an adhesive, or an interlocking arrangement. For example, in some instances, the sidewall 910 connects to the base plate 914 via a bracket 924 secured to the base plate 914. The sidewall 910 connects to the bracket 924 with fasteners 929, although other types of connections (e.g., welding, rivets, interlocking features, or an adhesive) can be used.

In the illustrated example, the base plate 914 is contoured to engage three elongated segments 114 that define three facets of the cylindrical body 102. The base plate 914 may be contoured to engaged fewer or additional facets of the cylindrical body 102.

Figure 9:
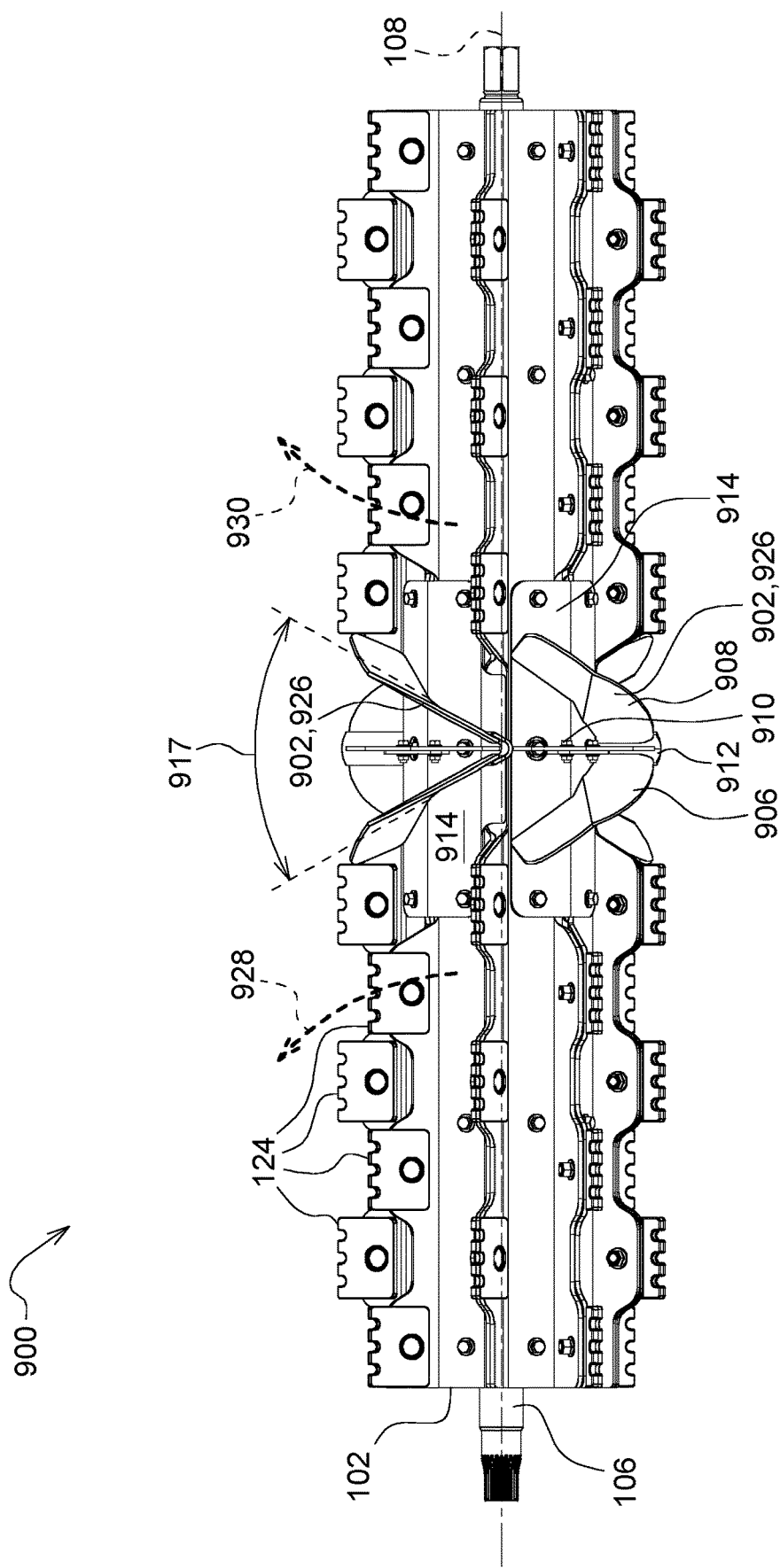
FIG. 9 is a front view of another example feed accelerator in a first configuration, according to some implementations of the present disclosure.

The sidewalls 906, 908, and 910 form an agitator 926 that operates to process crop material, separate the crop material into different flows, e.g., crop flows 928 and 930 shown in FIG. 9, and accelerate the crop material towards another system of a harvester, such as a threshing system of a combine harvester.

As shown in FIG. 12 and as explained earlier, the agitator 926 extends, at least partially, across three elongated sections 114 of the exterior wall 104. Thus, the sidewalls 908 and 910 are larger (e.g., longer) than the sidewalls 136 and 138 of the agitator 133, as seen by comparing FIG. 5 to FIG. 12. Further, in the case where the feed accelerators 100 and 900 are of comparable sizes, due to the increased size of the agitator 926, e.g., the increased angle 922 over which the agitator 926 extends, compared to the agitator 133, the agitator 926 imparts an increased amount of shear force into the crop material. The shear forces work to separate grain from MOG. Additionally, due to the increased size of the agitator assembly 902 and associated agitator 926, the agitator 926 extends across two rows 126 of paddles 124.

The convertible sections 130 are convertible as described earlier and can be converted between the agitator assembly 902 and the agitator assembly 904 in the same ways that the convertible sections 130 of the feed accelerator 100 can be converted, as described earlier. In other implementations, the convertible sections 130 can be converted between more than two types of agitator assemblies.

Figure 13:
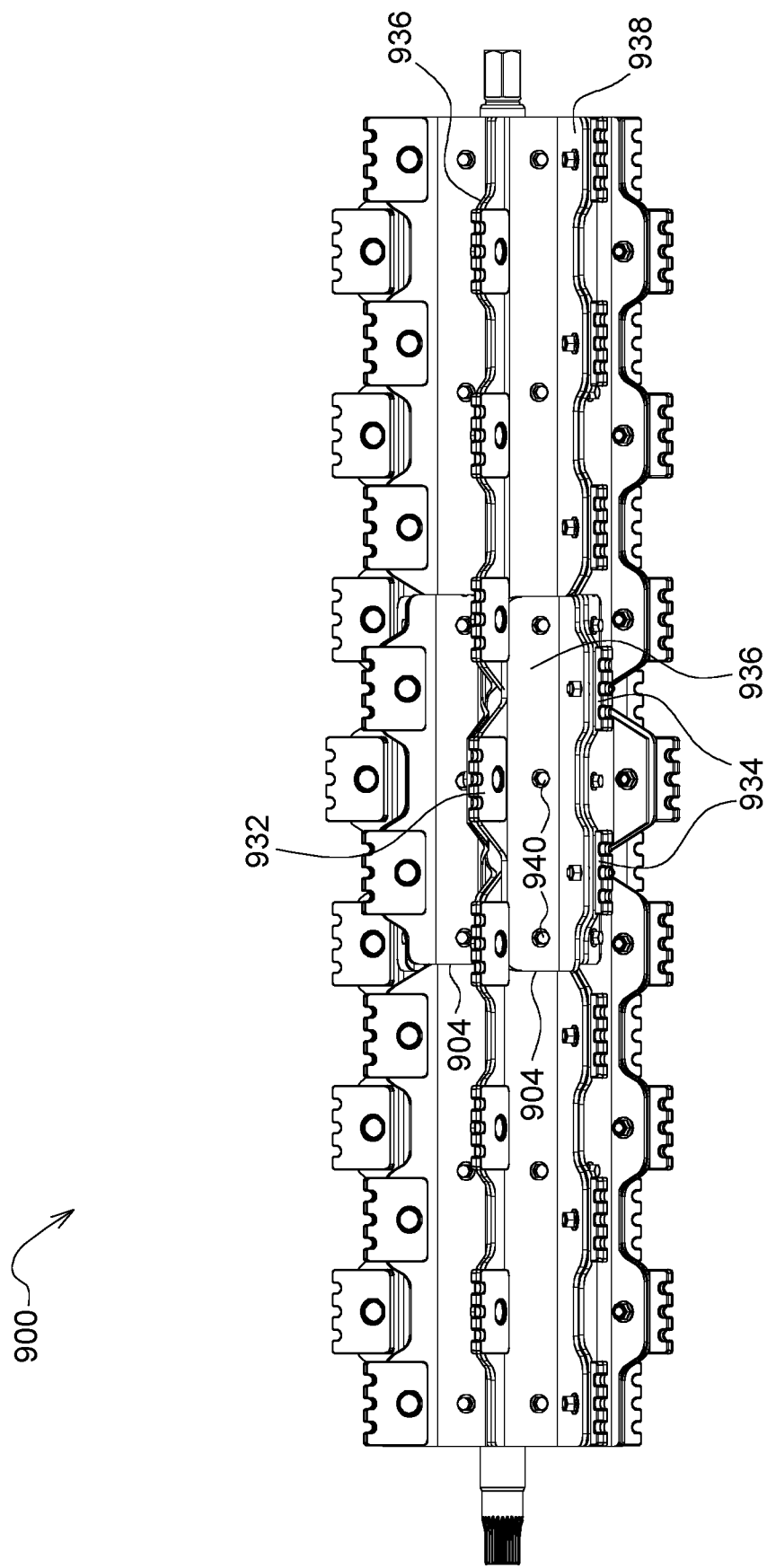
FIG. 13 is a front view of the feed accelerator of FIG. 9 in a second configuration.

As shown in FIG. 13, the agitator assembly 904 includes a first paddle 932 and second paddles 934. The first paddle 932 aligns with the paddles 124 in a first row 936 of the plurality of rows 126, and the second paddles 934 align with the paddles 124 in a second row 938 of the plurality of rows 126. The first and second rows 936 and 938 are disposed adjacent each other. In other implementations, additional first paddles 932 may be included and additional or fewer second paddles 934 may be included.

The agitator assembly 904 also includes a base plate 936 to which the paddles 932 and 934 are coupled. The paddles 932 and 934 couple to the base plate, for example, via fasteners, rivets, interlocking features, or an adhesive. The base plate 936 attaches to the exterior wall 104 with fasteners 940. In other implementations, the base plate 936 attaches to the exterior wall in other ways, such as an interlocking joint, rivets, welding, or an adhesive. The base plate 936 is contoured to engage three elongated sections 114 defining three facets of the cylindrical body 102. In other implementations, the base plate 936 can engage additional or fewer facets of the cylindrical body 102.

Without in any way limiting the scope, interpretation, or application of the claims appearing below, a technical effect of one or more of the example implementations disclosed herein is providing a feed accelerator this is convertible between different types of crop engaging components, such as different agitators. In this way, changing a configuration of the feed accelerator is less laborious and takes less time and avoids the time and cost associated with entirely removing a first feed accelerator and installing a different feed accelerator. As a result, a harvester associated with the feed accelerator experiences less downtime and is, therefore, available for increased utilization. Another technical effect of one or more of the example implementations disclosed herein is providing feed accelerators that increase shear forces imparted to harvested crop material, thereby improving separation of grain from MOG.

While the above describes example implementations of the present disclosure, these descriptions should not be viewed in a limiting sense. Rather, other variations and modifications may be made without departing from the scope and spirit of the present disclosure as defined in the appended claims.

What is claimed is:

1. A feed accelerator for an agricultural harvester, the feed accelerator comprising:
   a cylindrical body comprising an exterior wall;
   a central longitudinal axis extending along the cylindrical body, the cylindrical body rotatable about the central longitudinal axis;
   a plurality of first paddles arranged on the exterior wall; and
   a convertible section of the exterior wall, the convertible section convertible between a first agitator assembly including at least one sidewall defining a plane extending obliquely relative to and intersecting the central longitudinal axis and a second agitator assembly including at least one second paddle.

2. The feed accelerator of claim 1, wherein the first plurality of paddles arranged on the exterior wall are arranged in a plurality of rows extending along the cylindrical body, and wherein the second agitator assembly aligns with a row of the plurality of rows when the second agitator assembly is coupled to the cylindrical body such that the at least one second paddle aligns with the first plurality of paddles included in the row.

3. The feed accelerator of claim 1, wherein the first plurality of paddles arranged on the exterior wall are arranged in a plurality of rows extending along the cylindrical body parallel with the central longitudinal axis.

4. The feed accelerator of claim 1, wherein the cylindrical body comprises a length and wherein the convertible section is located at a central location along the length of the cylindrical body.

5. The feed accelerator of claim 1, wherein the convertible section is convertible from one of the first agitator assembly or the second agitator assembly to the other of the first agitator assembly or the second agitator assembly by replacement of one of the first agitator assembly or the second agitator assembly with the other of the first agitator assembly or the second agitator assembly.

6. The feed accelerator of claim 1, further comprising a plurality of convertible sections,
   wherein the first plurality of paddles arranged on the exterior wall are arranged in a plurality of rows extending along the cylindrical body, and
   wherein alternating rows of the plurality of rows align with one of the convertible sections.

7. The feed accelerator of claim 1, wherein the first plurality of paddles arranged on the exterior wall are arranged in a plurality of rows extending along the cylindrical body and wherein the first paddles of adjacent rows are laterally offset from each other.

8. The feed accelerator of claim 1, wherein the convertible section comprises a plurality of convertible sections removably couplable to the cylindrical body.

9. The feed accelerator of claim 1, wherein at least one of the first paddles defines a plane that is parallel with and laterally offset from the central longitudinal axis.

10. A feed accelerator for an agricultural harvester, the feed accelerator comprising:
    a cylindrical body comprising an exterior wall;
    a central longitudinal axis extending along the cylindrical body, the cylindrical body rotatable about the central longitudinal axis;
    a plurality of first paddles arranged on the exterior wall; and
    a convertible section of the exterior wall, the convertible section convertible between a first agitator assembly including at least one sidewall extending obliquely relative to the central longitudinal axis and a second agitator assembly including at least one second paddle;
    wherein the at least one sidewall of the first agitator assembly comprises a first sidewall and a second sidewall extending from the exterior wall, the first sidewall and the second sidewall forming a chevron shape.

11. The feed accelerator of claim 10, wherein the first sidewall and the second sidewall are bent such that end portions of the first sidewall and the second sidewall flare outwardly away from each other.

12. A feed accelerator for an agricultural harvester, the feed accelerator comprising:
    a cylindrical body comprising an exterior wall;
    a central longitudinal axis extending along the cylindrical body, the cylindrical body rotatable about the central longitudinal axis;
    a plurality of first paddles arranged on the exterior wall; and a convertible section of the exterior wall, the convertible section convertible between a first agitator assembly and a second agitator assembly;

wherein the first agitator assembly includes a first sidewall and a second sidewall extending from the exterior wall, the first sidewall and the second sidewall forming a chevron shape; and wherein the first agitator assembly further includes a third sidewall extending between the first sidewall and the second sidewall.

13. The feed accelerator of claim 12, wherein the third sidewall extends between ends of the first sidewall and the second sidewall.

14. The feed accelerator of claim 12, wherein a first end of the first sidewall and a first end of the second sidewall are coupled to form a vertex of the chevron and wherein the third sidewall extends from the vertex.

15. A method of configuring a feed accelerator in response to a change in crop conditions, the method comprising:
providing a feed accelerator comprising:
a cylindrical body comprising an exterior wall;
a central longitudinal axis extending along the cylindrical body, the cylindrical body rotatable about the central longitudinal axis;
a plurality of first paddles arranged on the exterior wall; and
a convertible section of the exterior wall, the convertible section convertible between a first agitator assembly including at least one sidewall defining a plane extending obliquely relative to and intersecting the central longitudinal axis and a second agitator assembly including at least one second paddle; and
converting from one of the first agitator assembly or the second agitator assembly to the other of the first agitator assembly or the second agitator assembly.

16. The method of claim 15, wherein:
the plurality of first paddles arranged on the exterior wall are arranged in a plurality of rows extending along the cylindrical body, and
the converting includes aligning alternating rows of the plurality of rows with one of the convertible sections.

17. The method of claim 15, wherein:
the converting includes replacing one of the first agitator assembly or the second agitator assembly with the other of the first agitator assembly or the second agitator assembly.

* * * * *